May 15, 1945.　　　L. O. REICHELT　　　2,375,946
CONTROL SYSTEM
Filed July 8, 1942　　　2 Sheets-Sheet 2

INVENTOR
L.O. REICHELT
BY
E.R. Nowlan
ATTORNEY

Patented May 15, 1945

2,375,946

UNITED STATES PATENT OFFICE 2,375,946

CONTROL SYSTEM

Lester O. Reichelt, Cranford, N. J., assignor to Western Electric Company, Incorporated, New York, N. Y., a corporation of New York Application July 8, 1942, Serial No. 450,221

8 Claims. (Cl. 18—16)

This invention relates to control systems, and more particularly to control systems for pressure molding presses.

In certain types of molding presses where plastic articles are molded through the application of pressure and heat, the mold members are closed under a predetermined low pressure, then opened a desired distance to allow the escapement of gases and subsequently closed under high pressure to complete the molding of the article. The time intervals for each of these operations are usually of great importance in the accurate molding of such articles, and to rely upon manual control for the operation of the press it is possible that the time intervals for the various actions of the press may not be constant.

An object of the invention is to provide a control system which is highly efficient in automatically causing operation of an apparatus through various cycle portions at constant given time intervals.

With this and other objects in view the invention comprises a control system, particularly for molding presses wherein fluid control means is employed to actuate the press, electrical means being adapted to control valves of the fluid control means to cause operation of the press under varied pressures between varied positions in given varied time limits.

Figure 1:
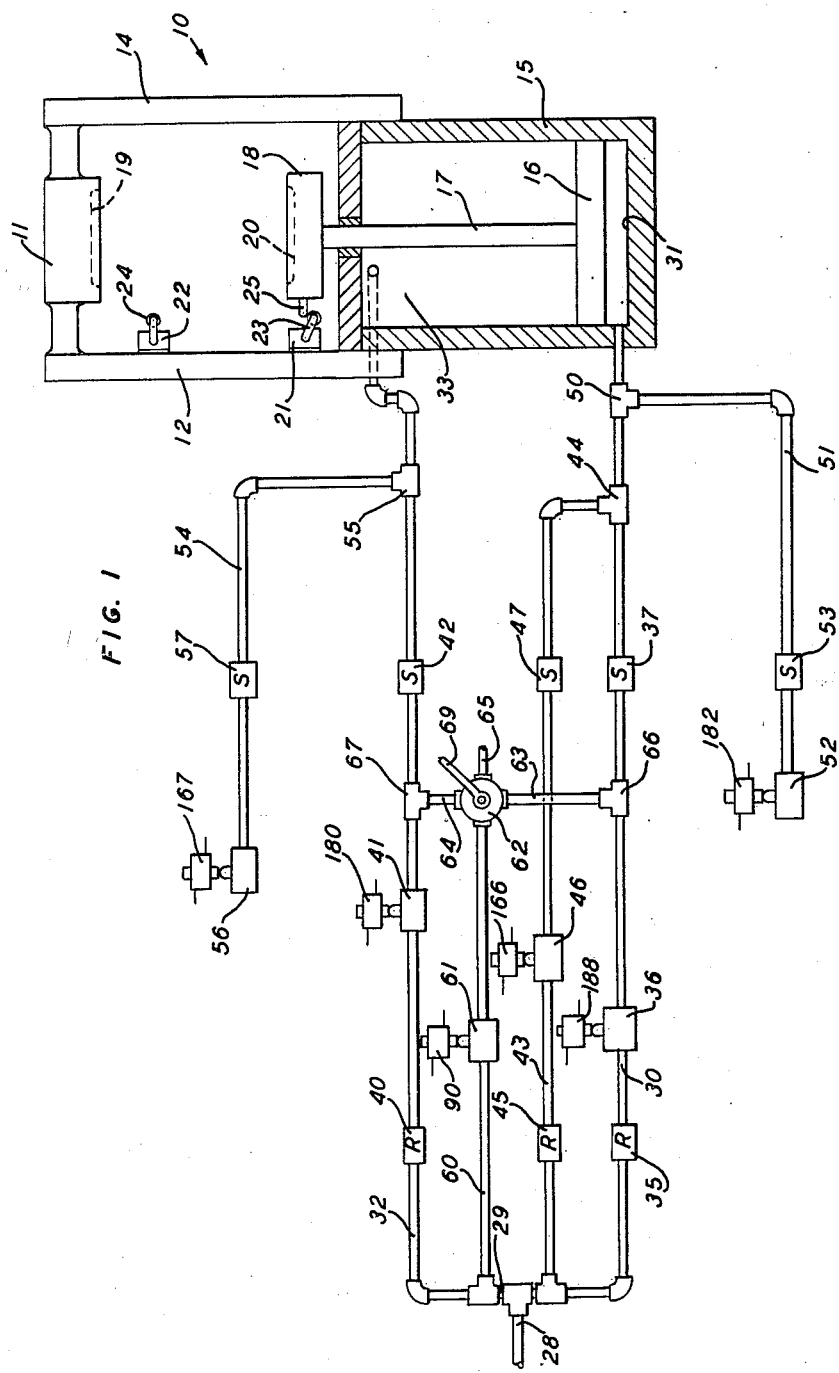
Figure 2:
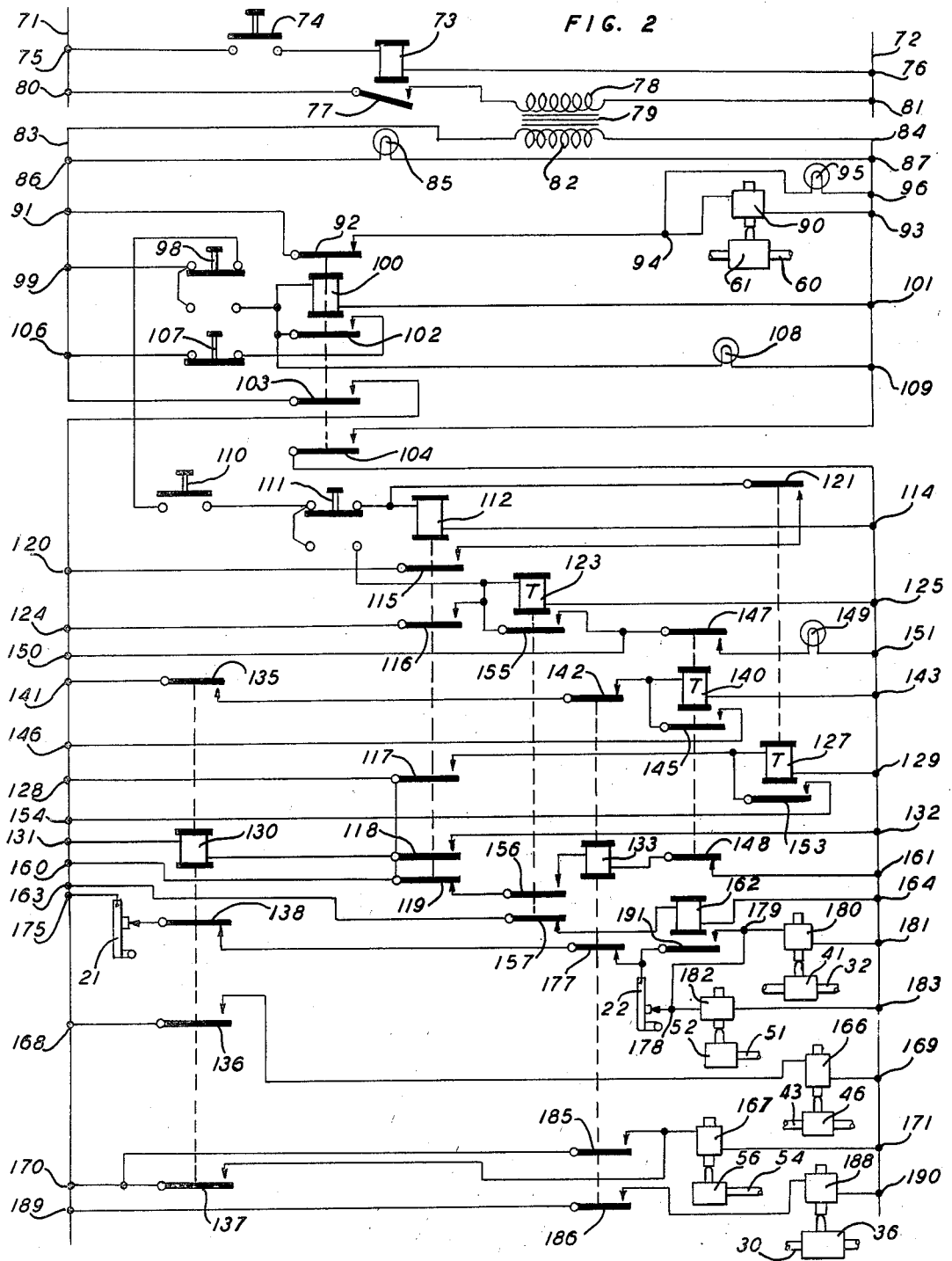

Other objects and advantages will be apparent from the following detailed description when considered in conjunction with the accompanying drawings, wherein Fig. 1 is a schematic front elevational view of a molding press and the fluid control means therefor, and Fig. 2 is a wiring diagram illustrating the electrical control system for the structure shown in Fig. 1.

Referring now to the drawings, attention is first directed to Fig. 1, which illustrates schematically a molding press, indicated generally at 10, having a fixed mold member 11 mounted in any suitable manner such as between vertical supports 12 and 14. The supports in the present illustration are mounted upon a cylinder 15 in which a piston 16 is disposed. A piston rod 17 connects the piston 16 to a mold member 18 disposed in general alignment with the mold member 11. The mold members 11 and 18 are provided with suitable cavities 19 and 20, respectively, formed of the contours desired for the molding of an article therein. The mold members may also be provided with suitable means (not shown) to heat them to the desired temperature for the molding operations. The detailed structure of the mold members and the press in general is not believed necessary for a clear understanding of the invention. Attention is directed to limit switches which may be respectively termed lower and upper limit switches 21 and 22. These limit switches may be mounted so that their control levers 23 and 24 respectively may be actuated by an arm 25 movable with the mold member 18. In the present illustration the limit switches are mounted upon the vertical support 12.

A fluid control means is connected to the cylinder 15 to cause movement of the piston 16 to close the mold (including the mold members 11 and 18) under a low pressure, open the mold a given distance, close the mold again under a high pressure and finally open the mold by returning the mold member 18 to its normal or loading position (Fig. 1). This fluid control means begins with a supply line 28 which is adapted to supply a fluid, such as air, under a sufficiently high pressure to a fluid line 29. A fluid line 30 connects the fluid line 29 with a lower end 31 of the cylinder 15, while a fluid line 32 connects the fluid line 29 with an upper end 33 of the cylinder.

Considering first the fluid line 30, it will be noted that a reducing valve 35 is disposed therein, this valve being of a conventional type and adapted to reduce the pressure of the fluid in the line 30 between this valve and the cylinder to a given high pressure. Also, in the fluid line 30 is a solenoid-operated valve 36 of a conventional type adapted to open the line and allow the fluid therein to pass to the cylinder under the full pressure controlled by the valve 35. Another valve 37 is disposed in the line 30, this valve being of a type to control the speed of the fluid to the lower portion 31 of the cylinder. Thus there is provided in the line 30, the valve 35 to control the pressure of the fluid in the line, the valve 36 to open and close the line 30 and the valve 37 to control the speed of the fluid in the line to the cylinder.

The line 32 is substantially identical with the line 30 in that there is provided a reducing valve 40, a solenoid-operated valve 41, and a speed control valve 42, therein. The solenoid-operated valve 41 opens the line 32 to supply fluid under a pressure controlled by the valve 40 and at a speed controlled by the valve 42.

Attention is now directed to another fluid line 42, which extends from the line 29 to a connection 44 in the line 30, and thus through the adjacent part of the line 30 to the lower end 31 of the cylinder. In the line 43 the same arrangement of valves is provided, namely a reducing valve 45, a solenoid-operated valve 46 and a speed control valve 47. The valves 46 and 36 will not be operated at the same time. Thus, when the valve 46 is opened, fluid from the supply to the line 28 will pass to the lower portion 31 of the cylinder under a pressure controlled by the valve 45 and at a speed controlled by the valve 47. The lines 30 and 43 with their various valves may be termed high pressure and low pressure lines, as it is through these lines that the fluid under different pressures causes the piston with the movable mold member to be moved upwardly under high and low pressures.

The fluid lines to supply fluid under varying pressures to the cylinder have been described. Linked with these lines must of necessity be exhaust lines. Attention is therefore directed to line 30 where, at connection 50, is provided an exhaust line 51. In the exhaust line 51 a solenoid-operated valve 52 is disposed to open and close the line; also, a speed control valve 53 is disposed to control the speed of movement of the exhaust fluid from the cylinder and to function, through the fluid it controls, as a cushioning means for the piston 16. A similar exhaust line 54 leads from the line 32 at connection 55 and is provided with a solenoid-operated valve 56 and a speed controlled valve 57. This line is opened during the upward movement of the piston to allow the fluid above the piston to escape at a given speed controlled by the valve 57.

Thus far there have been described high and low pressure feeding lines for moving the mold member 18 upwardly and the feeding line to move the mold member downwardly, together with the exhaust lines linked therewith. Such lines are, as will hereinafter be described, under a complete control of the electrical units and their circuits shown in Fig. 2. However, to condition the apparatus so that, if desired, it may be under manual control during testing of the apparatus, another fluid line 60 is connected to the line 29 and is opened, through a solenoid-operated valve 61, to supply fluid to a manually controlled valve 62. The valve 62 may be of the four-way type connected not only to the line 60 but to supply lines 63, 64 and an exhaust line 65. The lines 63 and 64 communicate with lines 30 and 32 at connections 66 and 67 respectively. Through this arrangement the manually operated valve 62 when in the position shown, will, through the opening of the valve 61, permit fluid under pressure to pass through line 60, valve 62, line 63, connection 66, and through the portion of line 30 to the lower portion 31 of the cylinder under the control of the valve 37. At the same time an exhaust line is provided for the fluid above the piston to pass through line 32 to connection 67, line 64, valve 62, and exhaust line 65 under the control of the valve 42. By turning the valve 62 a sufficient distance through the aid of its handle 69, the circuits just described may be closed and another set of circuits opened to supply fluid to the upper portion 33 of the cylinder and exhaust the fluid from the lower portion 31 of the cylinder. These circuits may be traced through lines 29 and 60, valve 62, line 64, to connection 67, valve 42, line 32, to the cylinder. The exhaust line for the lower portion of the cylinder may be traced from the cylinder, through line 30 and valve 37, connection 66, line 63, valve 62, and exhaust line 65. All of the valves previously described are standard and thus commercially known. It is therefore not believed necessary to show and specifically describe them for a clear understanding of the invention.

Attention is now directed to the electrical control means illustrated in Fig. 2 and linked with the fluid control means of Fig. 1. In the present embodiment lines 71 and 72 from a 440-volt source of electrical energy are provided. One circuit adapted to energize a relay 73 when a switch 74 is closed, may be traced from line 71 at connection 75 through switch 74, relay 73, to line 72 at connection 76. Another circuit controlled by the relay through its contact 77 may be closed thereby to direct the electrical energy through a primary winding 78 of a transformer 79. The last mentioned circuit may be traced from line 71 at connection 80 through contact 77 when closed, through winding 78 to line 72 at connection 81. A secondary winding 82 of the transformer 79 will thus supply a 110-volt electrical energy to lines 83 and 84. When this electrical energy is supplied to the lines 83 and 84, a visual signal or lamp 85 is illuminated, it being in a circuit traced from line 83 at connection 86 to line 84 at connection 87. As soon as the switch 74 is closed to energize the relay and supply the 440-volt electrical energy to the transformer, the manual control means for the fluid system illustrated in Fig. 1 is rendered effective for operation. This results from the opening of the valve 61 in the line 60 (Fig .1). The operation of the valve 61 is brought about through the energization of a solenoid 90 associated therewith, the solenoid being in a circuit which may be traced from line 83 at connection 91 through a normally closed contact 92 and solenoid 90 to line 84 at connection 93. Another circuit is tapped into the last mentioned circuit at connection 94 and extends through a visual signal or lamp 95 to line 84 at connection 96. The visual signal 95 indicates that the control system has been conditioned for the manual operation of the apparatus.

To render the manual operating means ineffective and cause automatic operation of the apparatus, a switch 98 is moved from its upper position shown, to complete a circuit from line 83 at connection 99, through the switch 98 in its lower position, a relay 100, to line 84 at connection 101. The switch 98 need be moved to its lower position only long enough for the energization of the relay 100, after which it may be allowed to return to its upper postion (shown). However, upon energization of the relay 100, the contact 92 will be opened, opening the circuit to the solenoid 90 and effecting closing of the valve 61. Thus the manual control means is rendered ineffective. Energization of the relay 100 also closes contacts 102, 103 and 104. The contact 102 in closing, completes a locking circuit through the relay 100 which may be traced from line 83 at connection 106 through a switch 107, contact 102, relay 100, to line 84 at connection 101.

Returning momentarily to the switch 98, it will be observed that another circuit will be completed with the circuit through the relay 100 upon the movement of this switch to its lower position, the circuit being traced from line 83 at connection 99 through switch 98 in its lower position, a visual signal or lamp 108, to line 84 at connection 109. The visual signal 108 indicates that the automatic control system is ready for operation. This signal remains energized, after the movement of the switch 98 to its upper position, through a circuit controlled by the locking circuit of the relay or contact 102 and may be traced from line 83 at connection 106, through the normally closed switch 107, contact 102, through the visual signal or lamp 108, to line 84 at connection 109.

The contacts 103 and 104 serve to close normally open portions in the lines 83 and 84 respectively; thus the closing of the contacts 103 and 104 thorugh the energization of the relay 100 closes the lines 83 and 84 to supply electrical energy for the remaining units in the control system. The function of the control system thus far described conditions the automatic features thereof for operation. All that remains for the operator to do at this point is to close a switch 110.

By closing the switch 110 a circuit is completed from line 83 at connection 99 through switch 98 in the upper position shown, switch 110, a normally closed stop switch 111, a relay 112, to line 84 at connection 114. The relay 112 is thus energized, closing contacts 115, 116, 117 and 118 and opening contact 119. The closing of the contact 115 will condition a locking circuit for the relay 112 which may be traced from line 83 at connection 120 through closed contact 115, a contact 121 when closed, a relay 112, to line 84 at connection 114. The closing of the contact 116 completes a circuit through a time control relay 123 which may be traced from line 83 at connection 124 through closed contact 116, relay 123, to line 84 at connection 125. The closing of the contact 117 will complete a circuit through another time control relay 127, which circuit may be traced from line 83 at connection 128 through closed contact 117, relay 127, to line 84 at connection 129. Energization of the relay 127 will close the contact 121 to complete the locking circuit through the relay 112 by closing its contact 117. Closure of the contact 118 completes a circuit for a relay 130 which may be traced from line 83, at connection 131, through relay 130, closed contact 118, to line 84 at connection 132. The contact 119 opens a circuit to a relay 133, the purpose of which will hereinafter be described.

Attention is now directed to the relay 130, which is energized through the closing of the contact 118 to close contacts 135, 136 and 137 and open a contact 138. The closing of the contact 135 will complete a circuit through another time control relay 140, which circuit may be traced from line 83 at connection 141 through contact 135, normally closed contact 142, relay 140, to line 84 at connection 143. Upon energization of the relay 140 through the completion of its circuit, a locking circuit is completed through the closing of a contact 145, this circuit being traced from line 83 at connection 146 through contact 145, relay 140, to line 84 at connection 143. There are two other contacts under the control of the relay 140, the relay when energized closing a contact 147 and opening a normally closed contact 148. The closing of the contact 147 completes a circuit through an indicating signal or lamp 149, the circuit being traced from line 83 at connection 150, through contact 147, lamp 149, to line 84 at connection 151. The contact 148 is in the circuit for the relay 133 and also functions to control this relay.

Referring now to the relay 127, this relay provides its own locking circuit through the closing of its contact 153, this circuit being traced from line 83 at connection 154, through contact 153, the relay 127, to line 84 at connection 129. Consider now the contacts for the relay 123 indicated at 155, 156 and 157. Upon energization of the relay 123, contacts 155 and 156 will be closed and the contact 157 will be opened. The contact 155 will complete a locking circuit for the relay 123, which circuit may be traced from line 83 at connection 150, through contact 155, relay 123, to line 84 at connection 125. The contact 156 is a part of the circuit for the relay 133 and functions with the contacts 119 and 148 to condition this circuit, which, when closed through the closing of these contacts, may be traced from line 83 at connection 160, through contacts 119 and 156, relay 133, and contact 148, to line 84 at connection 161. The contact 157 opens a circuit to a relay 162, this circuit being traced from line 83 at connection 163, through contact 157 when closed, relay 162, to line 84 at connection 164.

Attention is now directed to contacts 136, 137 and 138 of the relay 130. The contact 138 is opened upon energization of its relay, rendering ineffective circuits adapted to actuate what might be termed the down valve 41 and the bottom exhaust valve 52. The contacts 136 and 137, however, are closed and complete circuits through solenoids 166 and 167 respectively, to cause opening of their respective valves 46 and 56 which might be termed the low pressure valve and the top exhaust valve. The circuit through the solenoid 166 may be traced from line 83 at connection 168 through contact 136 when closed, solenoid 166, to line 84 at connection 169. The circuit for the solenoid 167 may be traced from line 83 at connection 170, through contact 137, solenoid 167, to line 84 at connection 171. Thus it will be apparent that upon actuation of the switch 110 and after the preceding circuits have functioned to condition the automatic portion of the system for functioning, the valves 46 and 56 will be opened to cause upward movement of the piston under low pressure, resulting from the opening of the valve 46 and the exhausting of the fluid above the piston through the opening of the valve 56.

At this time attention is directed to the time control relays 123, 127 and 140. They have their important functions in the operation of the control system. It should be understood that these relays are schematically shown, the letters T present thereon are to indicate that they are time control relays of a conventional type, energizable upon the completion of their circuits and adapted to hold their contacts in the attracted positions for given lengths of time.

Considering now the operation of the control system, let it be assumed that the press is in its open position shown in Fig. 1. Upon closing the switch 74 (Fig. 2), the circuit is completed through the relay 73, closing its contact 77 to complete the circuit to supply electrical energy to the transformer 79. As a result, the desired electrical energy is supplied to the lines 83 and 84. The visual signal 85 is illuminated, indicating to the operator that the electrical energy is supplied to the lines 84 and 84. With the control system thus arranged, the operator may at this time, if he so desires, cause operation of the press through the actuation of the valve 62, as the line 60 has been opened through the opening of the valve 61, this occurring by the energization of the solenoid 90. At the same time the lamp or visual signal 95 will be illuminated to indicate that such has taken place. The control system remains in this condition as long as desired. By moving the valve 62 into a position so that the fluid under pressure will be directed through the line 63, the speed of this fluid will be controlled by the valve 37 before it enters the lower portion 31 of the cylinder 15. The valve 62 is so constructed that upon providing communication between the line 60 and the line 63, communication will be simultaneously established between the lines 64 and 65 so as to allow the fluid above the piston in the cylinder to exhaust through lines 32 and 64, the valve 62, and the exhaust line 65. In this manner the mold member 18 may be moved relative to the mold member 11 into closed position, if so desired. To move the mold member 18 away from the mold 11, the valve 62 may be moved into another position to connect the line 64 with the line 60 and the line 63 with the exhaust line 65, and in this manner the piston will be moved downwardly, the fluid beneath the piston exhausting through lines 30 and 63, the valve 62, and the exhaust line 65. In such instance the speed control valves 37 and 42 serve to control the speed of the fluid passing through their lines.

Consider now the automatic control feature of the system. First, let it be assumed that the press is in the open position, and that the previously described circuits have been completed through the closing of the switch 74. At this time the switch 98 may be moved to its lower position to momentarily close the circuit through the relay 100, at which time the locking circuit for the relay, through its contact 102 and the normally closed switch 107, is completed, after which the switch 98 may be allowed to return to its normal or upper position. Upon energization of the relay 100, the attraction of its contacts will render the manual control portion of the system inoperative through the opening of the contact 92 and will close the adjacent brakes in the lines 83 and 84 at the contacts 103 and 104. At this time the visual signal 95 ceases to be illuminated and a new signal 108 is illuminated to indicate that the automatic feature of the system is ready for actuation. An additional step, however, is necessary to start the automatic feature of the control system, this being the closing of the switch 110. At this time the relay 112 is energized, attracting its contacts and thus causing energization of the relay 130 in addition to the time relays 123, 127 and 140.

The moment the switch 110 is closed circuits are completed through the contacts 136 and 137 of the relay 130 to cause energization of the solenoids 166 and 167 therein, to open their respective valves 46 and 56. Attention is now directed to Fig. 1, where, with the valves 46 and 56 open, the fluid control portion of the system is caused to allow fluid under low pressure governed by the reducing valve 45 to pass at a speed controlled by the valve 47 into the lower portion of the cylinder 15 to thus move the mold member 18 into closed position relative to the mold member 11 under the said low pressure. The fluid above the piston escapes through the valve 56 at a speed controlled by the valve 57. This operation is under the control of the time relay 127, which in the present embodiment is set for deenergization after five seconds have elapsed. At the completion of this time interval and upon deenergization of the relay 127, the contact 121 will be opened, opening the locking circuit for the relay 112, thus effecting deenergization of this relay. As a result, contacts 115, 116, 117 and 118 will be opened, and contact 119 will be closed, these contacts being under the control of the relay 112. At the same time, through the opening of the contact 118 the relay 130 will be deenergized, effecting opening of the contacts 135, 136 and 137 and the closing of the contact 138. Thus after the completion of the given time interval, which in the present instance is five seconds, the valves 46 and 56 will be allowed to close through the deenergization of the solenoids 166 and 167.

The closing of the contact 138 will complete two circuits, one of which may be traced from line 83 at connection 175 through the lower limit switch 21, contact 138, a normally closed contact 177 of the relay 133, through the upper limit switch 22, connections 178 and 179, solenoid 180, to line 84 at connection 181. The other circuit may be traced from line 83 at connection 175 through the lower limit switch 21, contacts 138 and 177, the upper limit switch 22, a solenoid 182, to line 84 at connection 183. When these circuits are closed and their respective solenoids 180 and 182 energized, the associated valves 41 and 52 will be opened to cause downward movement of the mold member 18 away from the mold member 11. The limit of this movement is under the control of the upper limit switch 22, the arm 25 on the mold member 18 causing opening of this limit switch when the mold member reaches a given distance below the upper mold member. When the upper limit switch 22 is opened the circuits controlling the valves 41 and 52 through their solenoids 180 and 182 will be allowed to close and the press will remain at rest, with the mold member in its lowered position for a given length of time controlled by the time relay 140. The purpose of opening the mold members, for example when molding plastic materials in heated molds, is to allow any gasses, resulting from the first step of the molding operation, to escape prior to the final molding step.

During the energization of the time control relay 140, it will be observed that the contact 148 thereof is open, holding the circuit to the relay 133 open until the expiration of the time interval in which relay 140 is energized, which in the present instance is eight seconds. Thus, upon rapid closing of the press and allowing five seconds for this operation and for the press to remain closed during the first step of the molding operation, there is an additional three seconds allowed through the control of the relay 140 for the opening of the press and the maintaining of the press in the open position. At the expiration of eight seconds the relay 140 becomes deenergized, allowing contacts 145 and 147 to open and the contact 148 to close.

At this time the signal 149 will be deenergized and the circuit to the relay 133 will be closed due to the fact that the contact 119 has previously been closed through the deenergization of the relay 112 and the contact 156 is being held closed by the relay 123. Thus the energization of the relay 133 will open the contact 177 and close contacts 185 and 186. The last mentioned contacts 185 and 186 complete circuits to cause upward movement of the mold member 18 under high pressure. The contact 185 completes the circuit to control the top exhaust valve 56 for the escapement of the fluid above the piston, while the closure of the contact 186 completes a circuit through a solenoid 188 for opening the valve 36. The last mentioned circuit may be traced from line 83 at connection 189 through contact 186, solenoid 188, the line 84 at connection 190. The energization of the solenoid 188 will open the line 30 to allow fluid at a high pressure controlled by the valve 35 to pass into the lower portion 31 of the cylinder at a speed controlled by the valve 37 to move the mold member 18 again into closed position, this time under high pressure to complete the molding of the article.

The mold remains closed a definite time interval under the control of the relay 123, which has been energized since the closing of the switch 110 and during the previous operations of the press. In the present embodiment the time interval of energization of this relay is three minutes, leaving approximately two minutes and fifty-two seconds for the mold to remain closed under high pressure, the other eight seconds having been previously taken by the other operations, namely the original closing of the press under low pressure, the opening of the press under the control of the time relay 140, and the second closing of the press under high pressure. At the expiration of the three minutes the time relay 123 will be deenergized, effecting opening of the contacts 155 and 156 and the closing of the contact 157. The opening of the contact 155 opens the locking circuit for the relay 123. The opening of the contact 156 opens the circuit for the relay 133, the deenergization of which causes opening of the contacts 185 and 186 and the closing of the contact 177. In this manner, at the expiration of the time limit for the energization of the relay 123, the circuits to the solenoids 167 and 188 are open, allowing their respective valves 56 and 36 to close.

The closing of the contact 157 will complete the circuit through the relay 162, energizing the relay to close its contact 191. Thus upon closure of the contact 177 a circuit for the solenoid 180 is completed from line 83 at connection 175 through the limit switch 21, contacts 138, 177 and 191, through solenoid 180, to line 84 at connection 181. At the same time a circuit is completed through the solenoid 182 and may be traced from line 83 at connection 175 through the limit switch 21, contacts 138, 177 and 191, through connections 179 and 178, solenoid 182, to line 84 at connection 183. The portion of the circuit between connections 179 and 178 extends around the upper limit switch 22 so that the actuation of this limit switch during the downward movement of the mold member 18, will not effect the circuits just described. These circuits cause energization of the solenoids 180 and 182 to open the valves 41 and 52 respectively, to cause downward movement of the piston and its mold member 18 until they reach their open positions shown in Fig. 1, at which time the limit switch 21 will be actuated into open position to open both circuits to the solenoids 180 and 182, effecting opening of their respective valves. The press is thus in readiness for another operating cycle, which may be carried out in the same manner. Attention is momentarily directed to the switches 107 and 111, the purpose of these switches being to stop the press, by rendering ineffective the control means, when desired.

At the completion of each operating cycle the control system returns to the point where the operation of the switch 98 is required to start a new operating cycle. It will, therefore, be apparent that in the control system there are various parts linked together to perform the various functions desired. One part includes the fluid control means having a manual control feature and an automatic control feature. Linked with these are the electrical features to render the manual control operable or inoperative and to carry out automatically a complete cycle of events to move the mold member from a normal open position into a closed position under a given pressure, to open the press a limited distance for a given length of time and subsequently close the press under a different pressure for another given length of time, after which the press is opened and returned to its normal position. Furthermore, the visual signals are provided to indicate the condition of the control system, whether it be in readiness for manual operation or automatic control, and to further indicate various stages of the automatic control during the operation of the press.

Although specific improvements of the invention have been shown and described, it will be understood that they are but illustrative and that various modifications may be made therein without departing from the scope and spirit of this invention as defined by the appended claims.

What is claimed is:

1. A control system for an apparatus having a unit with members adapted for relative movement into closed and open positions through movement of a piston in a cylinder by fluids under pressure to closing and opening ends of the cylinder, the control system comprising an opening fluid line for directing a fluid under pressure to the opening end of the cylinder, low and high pressure closing fluid lines for directing fluids under varied pressures to the closing end of the cylinder, valves in the fluid lines, operable solenoids for actuating their respective valves, and electrical means to automatically operate the solenoids at given time intervals to actuate first the valve in the low pressure closing fluid line to close the members, then actuate the valve in the opening fluid line to open the members, then actuate the valve in the high pressure fluid line to again close the members, and again actuating the valve in the opening fluid line to open the members.

2. A control system for an apparatus having a unit with members adapted for relative movement into closed and open positions through movement of a piston in a cylinder by fluids under pressure to closing and opening ends of the cylinder, the control system comprising an opening fluid line for directing a fluid under pressure to the opening end of the cylinder, low and high pressure closing fluid lines for directing fluids under varied pressures to the closing end of the cylinder, valves in the fluid lines, operable solenoids for actuating their respective valves, and electrical means to automatically operate the solenoids at given time intervals to actuate first the valve in the low pressure closing fluid line to close the members under a given pressure, then actuate the valve in the opening fluid line to open the members, then actuate the valve in the high pressure fluid line to again close the members under a higher pressure, and again actuating the valve in the opening fluid line to open the members.

3. A control system for an apparatus having a unit with members adapted for relative movement into closed and open positions through movement of a piston in a cylinder by fluids under pressure to closing and opening ends of the cylinder, the control system comprising a supply line for a fluid under pressure, an opening fluid line extending from the supply line to the opening end of the cylinder, low and high pressure closing fluid lines extending from the supply to the closing end of the cylinder, reducing valves disposed in the closing fluid lines to vary the fluid pressures therein, valves in the opening and closing fluid lines, operable solenoids for actuating their respective valves, and electrical means to automatically operate the solenoids at given time intervals to actuate first the valve in the low pressure closing fluid line to close the members, then actuate the valve in the opening fluid line to open the members, then actuate the valve in the high pressure fluid line to again close the members, and again actuating the valve in the opening fluid line to open the members.

4. A control system for an apparatus having a unit with members adapted for relative movement into closed and open positions through movement of a piston in a cylinder by fluids under pressure to closing and opening ends of the cylinder, the control system comprising a supply line for a fluid under pressure, an opening fluid line extending from the supply line to the opening end of the cylinder, low and high pressure closing fluid lines extending from the supply to the closing end of the cylinder, reducing valves disposed in the closing fluid lines to vary the fluid pressures therein, means disposed in the opening and closing fluid lines to control the speed of the fluid therethrough, valves in the opening and closing fluid lines, operable solenoids for actuating their respective valves, and electrical means to automatically operate the solenoids at given time intervals to actuate first the valve in the low pressure closing fluid line to close the members, then actuate the valve in the opening fluid line to open the members, then actuate the valve in the high pressure fluid line to again close the members, and again actuating the valve in the opening fluid line to open the members.

5. A control system for an apparatus having a unit with members adapted for relative movement into closed and open positions through movement of a piston by fluids under pressure directed to the opening and closing ends of the piston, the control system comprising an opening fluid line for directing a fluid under pressure to the opening end of the piston, a high pressure fluid line for directing fluid under a given high pressure to the closing end of the piston, a low pressure fluid line for directing fluid under a given low pressure to the closing end of the piston, normally closed valves in the fluid lines, operable solenoids adapted to open the valves, means to cause operation of the solenoid for the valve in the low pressure line to cause closing of the members, and a timing element adapted to render the last named means ineffective after a given length of time and to cause energization of the solenoid for the valve in the opening fluid line to cause opening of the members.

6. A control system for an apparatus having a unit with members adapted for relative movement into closed and open positions through movement of a piston by fluids under pressure directed to the opening and closing ends of the piston, the control system comprising an opening fluid line for directing a fluid under pressure to the opening end of the piston, a high pressure fluid line for directing fluid under a given high pressure to the closing end of the piston, a low pressure fluid line for directing fluid under a given low pressure to the closing end of the piston, normally closed valves in the fluid lines, operable solenoids adapted to open the valves, means to cause operation of the solenoid for the valve in the low pressure line to cause closing of the members, a timing element adapted to render the last named means ineffective after a given length of time and to cause energization of the solenoid for the valve in the opening fluid line to cause opening of the members, and means under the control of one of the members to cause deenergization of the last mentioned solenoid.

7. A control system for an apparatus having a unit with members adapted for relative movement into closed and open positions through movement of a piston by fluids under pressure directed to the opening and closing ends of the piston, the control system comprising an opening fluid line for directing a fluid under pressure to the opening end of the piston, a high pressure fluid line for directing fluid under a given high pressure to the closing end of the piston, a low pressure fluid line for directing fluid under a given low pressure to the closing end of the piston, normally closed valves in the fluid lines, operable solenoids adapted to open the valves, means to cause operation of the solenoid for the valve in the low pressure line to cause closing of the members, a timing element adapted to render the last named means ineffective after a given length of time and to cause energization of the solenoid for the valve in the opening fluid line to cause opening of the members, means to cause deenergization of the last mentioned solenoid, and time controlled means to cause operation of the solenoid for the valve in the high pressure fluid line.

8. A control system for an apparatus having a unit with members adapted for relative movement into closed and open positions through movement of a piston by fluids under pressure directed to the opening and closing ends of the piston, the control system comprising an opening fluid line for directing a fluid under pressure to the opening end of the piston, a high pressure fluid line for directing fluid under a given high pressure to the closing end of the piston, a low pressure fluid line for directing fluid under a given low pressure to the closing end of the piston, normally closed valves in the fluid lines, operable solenoids adapted to open the valves, means to cause operation of the solenoid for the valve in the low pressure line to cause closing of the members, a timing element adapted to render the last named means ineffective after a given length of time and to cause energization of the solenoid for the valve in the opening fluid line to cause opening of the members, means to cause deenergization of the last mentioned solenoid, time controlled means to cause operation of the solenoid for the valve in the high pressure fluid line, and means operable after a given length of time to render inoperative the last mentioned solenoid and again cause operation of the solenoid for the valve in the opening fluid line.

LESTER O. REICHELT.